United States Patent
Higa et al.

(10) Patent No.: US 7,995,169 B2
(45) Date of Patent: Aug. 9, 2011

(54) LIQUID CRYSTAL DISPLAY DEVICE AND ELECTRONIC APPARATUS

(75) Inventors: Masakatsu Higa, Chino (JP); Hayato Kurasawa, Matsumoto (JP)

(73) Assignee: Sony Corporation, Tokyo (JP)

( * ) Notice: Subject to any disclaimer, the term of this patent is extended or adjusted under 35 U.S.C. 154(b) by 1248 days.

(21) Appl. No.: 11/650,998

(22) Filed: Jan. 9, 2007

(65) Prior Publication Data

US 2007/0177080 A1    Aug. 2, 2007

(30) Foreign Application Priority Data

Feb. 1, 2006    (JP) .................................. 2006-024663

(51) Int. Cl.
G02F 1/1335    (2006.01)
G02F 1/1343    (2006.01)

(52) U.S. Cl. ........................................ 349/114; 349/139

(58) Field of Classification Search .......... 349/113–114, 349/139
See application file for complete search history.

(56) References Cited

U.S. PATENT DOCUMENTS

| | | | |
|---|---|---|---|
| 7,119,861 B2 | 10/2006 | Tsuchiya et al. | |
| 7,215,392 B2 | 5/2007 | Nakano et al. | |
| 7,242,448 B2 | 7/2007 | Okumura | |
| 7,245,343 B2 | 7/2007 | Suzuki et al. | |
| 7,307,681 B2 | 12/2007 | Okumura | |
| 7,573,551 B2 | 8/2009 | Koma et al. | |
| 2002/0171791 A1 | 11/2002 | Anno et al. | |
| 2005/0001962 A1* | 1/2005 | Maeda ........................... | 349/114 |
| 2005/0036088 A1 | 2/2005 | Okumura | |
| 2005/0083453 A1 | 4/2005 | Nakano et al. | |
| 2005/0184939 A1 | 8/2005 | Ueda et al. | |
| 2006/0077323 A1* | 4/2006 | Kurasawa ...................... | 349/114 |
| 2006/0132684 A1* | 6/2006 | Tanaka ........................... | 349/114 |
| 2006/0274234 A1* | 12/2006 | Takizawa ....................... | 349/108 |
| 2006/0274242 A1 | 12/2006 | Okumura | |

FOREIGN PATENT DOCUMENTS

| | | |
|---|---|---|
| JP | A-3-245122 | 10/1991 |
| JP | A 2000-047251 | 2/2000 |
| JP | A 2000-047252 | 2/2000 |
| JP | A 2000-047253 | 2/2000 |
| JP | A-2002-287158 | 10/2002 |
| JP | A-2003-279959 | 10/2003 |
| JP | A-2004-219528 | 8/2004 |
| JP | A-2006-11339 | 1/2006 |
| KR | 10-2005-0014737 | 2/2005 |
| KR | 10-2005-0026888 | 3/2005 |
| KR | 10-2005-0069957 | 7/2005 |
| KR | 10-2005-0086349 | 8/2005 |

OTHER PUBLICATIONS

Makoto Jisaki et al., "Development of Transflective LCD for High Contrast and Wide Viewing Angle by Using Homeotropic Alignment." Asia Display / IDW, pp. 133-136, 2001. Sang Soo Kim, "*Invited Paper*: The World's Largest (82-in.) TFT-LCD," Society of Information Display Digest, pp. 1842-1847, 2005.

* cited by examiner

*Primary Examiner* — Dung T. Nguyen
(74) *Attorney, Agent, or Firm* — K&L Gates LLP

(57) ABSTRACT

A liquid crystal display device includes a first substrate and a second substrate, a liquid crystal layer between the first and second substrates, and an alignment layer between the liquid crystal layer and at least one of the substrates. The liquid crystal layer contains liquid crystal molecules having a negative anisotropy of dielectric constant. The alignment layer aligns the liquid crystal molecules perpendicular to the substrate. The liquid crystal display device further includes pixels. Each pixel includes a plurality of subpixels expressing different colors. Each subpixel includes a stepped layer therein such that the stepped layer is disposed between the liquid crystal layer and at least one of the substrates. The stepped layer defines a first region and a second region in the subpixel. The thickness of the liquid crystal layer is relatively thick in the first region and relatively thin in the second region. The area ratio of the first region depends on a color expressed by the subpixel.

5 Claims, 6 Drawing Sheets under the electrode, the alignment of the liquid crystal molecules is not disturbed. Advantageous display can be provided.

LIQUID CRYSTAL DISPLAY DEVICE AND ELECTRONIC APPARATUS

BACKGROUND

1. Technical Field

The present invention relates to liquid crystal display devices and electronic apparatuses.

2. Related Art

As one of display devices used in mobile phones, there is known a liquid crystal display device using liquid crystal molecules aligned perpendicular to a substrate, i.e., homeotropic alignment liquid crystal display device. It is known that the homeotropic alignment liquid crystal display device has excellent viewing angle characteristics by means of multi-domain alignment. As a technique of making multiple domains, there is proposed a continuous pinwheel alignment (CPA) structure in which an opening or protrusion is formed in a transparent electrode and liquid crystal molecules are inclined in all directions, i.e., 360 degrees. The CPA structure is described in "Development of Transflective LCD for High Contrast and Wide Viewing Angle by Using Homeotropic Alignment" (Non-patent Document 1), M. Jisaki et al., Asia Display/IDW'01, pp. 133-136, 2001, and "The World's Largest (82-in.) TFT-LCD" (Non-patent Document 2), S. S. Kim et al., SID 05 DIGEST, pp. 1842-1847.

The above-described homeotropic alignment liquid crystal display devices have a challenge to improve the viewing angle characteristics in gray level. Non-patent Document 2 describes a method of dividing electrodes in each pixel to independently drive the divided electrodes. In this method, however, the load on the display device is large during driving because subpixels for red (R), green (G), and blue (B) are separately driven. In addition, since the optimum driving voltages for the R, G, and B subpixels differ from one another, a change in color depending on voltage is large.

SUMMARY

An advantage of some aspects of the invention is to provide a liquid crystal display device having a small change in color depending on viewing angle characteristics and excellent color reproducibility and an electronic apparatus including the liquid crystal display device.

According to an aspect of the invention, there is provided a liquid crystal display device including a first substrate and a second substrate, a liquid crystal layer between the first and second substrates, and an alignment layer between the liquid crystal layer and at least one of the substrates. The liquid crystal layer contains liquid crystal molecules having a negative anisotropy of dielectric constant. The alignment layer aligns the liquid crystal molecules perpendicular to the substrate. The liquid crystal display device further includes pixels. Each pixel includes a plurality of subpixels expressing different colors. Each subpixel includes a stepped layer therein such that the stepped layer is disposed between the liquid crystal layer and at least one of the substrates. The stepped layer defines a first region and a second region in the subpixel. The thickness of the liquid crystal layer is relatively thick in the first region and relatively thin in the second region. The area ratio of the first region depends on a color expressed by the subpixel.

With this structure, since a plurality of regions having different thicknesses of the liquid crystal layer are arranged in each subpixel, gray levels of the regions are mixed, leading to a gradual change in color as viewed at an angle. In other words, since the gray level characteristics of the first region is different from that of the second region, the gray level characteristics of these regions are averaged, so that a change in color caused in one region can be compensated for in the other region. In addition, since the area ratio between the regions having different thicknesses of the liquid crystal layer varies from color to color, a shift in γ characteristics can be corrected in each color. Thus, the liquid crystal display device can provide bright display having a small change in color depending on the viewing angle characteristics and excellent color reproducibility.

According to this aspect of the invention, preferably, the area ratio of the first region in the subpixel is larger as the wavelength of the color expressed by the subpixel is longer.

Generally, as the wavelength of a light component is shorter, a change in phase of the light component transmitting through a liquid crystal layer is larger. Regarding the voltage-transmittance characteristics, as the wavelength of a light component is shorter, a smaller voltage causes a change in transmittance. If the stepped layer is formed at the same area ratio of the first region in each of the subpixels of respective colors, a change in transmittance of a light component having a long wavelength may be insufficient. In accordance with this aspect of the invention, as the wavelength of a color light component is longer, the stepped layer is formed such that the area ratio of the first region is larger. Consequently, the change in transmittance does not vary from color to color. Thus, the liquid crystal display device with good color balance can be provided.

In accordance with this aspect of the invention, preferably, the liquid crystal display device further includes a plurality of electrodes on respective surfaces of the first and second substrates close to the liquid crystal layer. The electrodes drive the liquid crystal molecules. Each subpixel includes the electrode on at least one of the substrates. The electrode includes a plurality of island portions and a linking portion electrically connecting the adjacent island portions. The linking portion is two-dimensionally superimposed on a boundary region of the stepped layer.

With this arrangement, since the electrode in each subpixel includes a plurality of island portions, an oblique electric field generated on the end of each island portion upon application of a voltage controls homeotropic alignment of liquid crystal molecules such that the liquid crystal molecules are inclined toward the center of the island portion, thus forming a plurality of liquid crystal domains each having radial alignment of the liquid crystal molecules in a flat area of the corresponding island portion. As described above, a plurality of liquid crystal domains each having planar radial alignment are formed in each subpixel. Consequently, the viewing angle characteristics can be uniformed in all directions in each liquid crystal domain. The border between the liquid crystal domains is fixed to that between the adjacent island portions. Thus, a stain or chrominance non-uniformity is not caused as a display panel is viewed at an angle. Display with good quality can be obtained. In accordance with this aspect of the invention, the boundary region of the stepped layer in each subpixel is two-dimensionally superimposed on the linking portion for electrical connection between the adjacent island portions. Consequently, deterioration of display quality caused by a stepped structure can be effectively prevented. The liquid crystal molecules are aligned along an inclined surface of the stepped layer in the boundary region thereof. If the electrodes are disposed in the boundary region, an oblique electric field is generated upon application of a voltage, so that the alignment of the liquid crystal molecules may be disturbed. In accordance with this aspect of the invention, since the linking portion is disposed in the boundary region of the stepped layer so that the area of the electrodes is reduced as much as possible, deterioration of display quality caused by the boundary region can be minimized.

According to this aspect of the invention, the liquid crystal display device may further include a light-shielding layer on at least one of the first and second substrates. Preferably, the light-shielding layer is two-dimensionally superimposed on the boundary region of the stepped layer in the subpixel.

With this arrangement, the alignment of the liquid crystal molecules in the boundary region of the stepped layer can be prevented from being disturbed. Thus, the liquid crystal display device can provide display with higher display quality.

According to another aspect of the invention, there is provided a liquid crystal display device including a first substrate and a second substrate, a liquid crystal layer between the first and second substrates, and an alignment layer between the liquid crystal layer and at least one of the substrates. The liquid crystal layer contains liquid crystal molecules having a negative anisotropy of dielectric constant. The alignment layer aligns the liquid crystal molecules perpendicular to the substrate. The liquid crystal display device further includes pixels. Each pixel includes a plurality of subpixels. Each subpixel has a transmissive display area for transmissive display and a reflective display area for reflective display. The subpixel includes a stepped layer therein such that the stepped layer is disposed between the liquid crystal layer and at least one of the substrates. The stepped layer defines a first region and a second region in the transmissive display area of the subpixel. The thickness of the liquid crystal layer is relatively thick in the first region and relatively thin in the second region. The area ratio of the first region depends on a color expressed by the subpixel. The subpixel may further include a thickness adjusting layer therein such that the thickness adjusting layer is disposed between the liquid crystal layer and at least one of the first and second substrates. The thickness adjusting layer makes the thickness of the liquid crystal layer in the reflective display area less than that in the transmissive display area. It is preferred that the stepped layer be disposed in the transmissive display area and the stepped layer and the thickness adjusting layer be made of the same material.

With this arrangement, the liquid crystal display device uses a multi-gap structure in which the thickness of the liquid crystal layer (i.e., the cell gap) in the transmissive display area is different from that in the reflective display area. Consequently, good display characteristics can be obtained in both of transmissive and reflective display modes. In addition, since the stepped layer and the thickness adjusting layer are made of the same material, these layers can be formed by the same process, leading to ease of manufacture.

According to this aspect of the invention, it is preferred that the thickness of the liquid crystal layer in the second region be approximately equal to that in the reflective display area.

With this arrangement, the stepped layer and the thickness adjusting layer can be formed more easily.

According to further another aspect of the invention, there is provided an electronic apparatus including the liquid crystal display device in accordance with any of the above-described aspects of the invention.

With this structure, the electronic apparatus having a small change in color depending on viewing angle characteristics and excellent color reproducibility can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. The technical scope of the invention is not limited to the following embodiments. In each figure referred to in the following description, respective components are shown on an arbitrary scale changed as appropriate so that the components are easy to see.

In the following description, a side of each component close to a liquid crystal layer in a liquid crystal display device will be called an "inner side" and the opposite side thereof will be called an "outer side". The minimum unit for image display will be called a "subpixel". A group of subpixels having respective color filters will be called a "pixel". A "non-selective voltage application mode" means a mode in which a voltage applied to the liquid crystal layer is close to a threshold voltage of liquid crystal" and a "selective voltage application mode" means a mode in which a voltage applied to the liquid crystal layer is higher than the liquid-crystal threshold voltage. In the following embodiments, in a planar region of each subpixel in a transflective liquid crystal display device, an area where display can be performed using light coming from a display surface of the liquid crystal display device will be called a "reflective display area" and an area where display can be performed using light coming from a rear surface (the side opposite to the display surface) of the liquid crystal display device will be called a "transmissive display area".

First Embodiment

A liquid crystal display device 100 according to a first embodiment of the invention will now be described with reference to FIGS. 1A to 3. The liquid crystal display device 100 in accordance with the present embodiment is an active matrix type using a thin film transistor (hereinafter, TFT) as each pixel switching element.

Figure 1A:
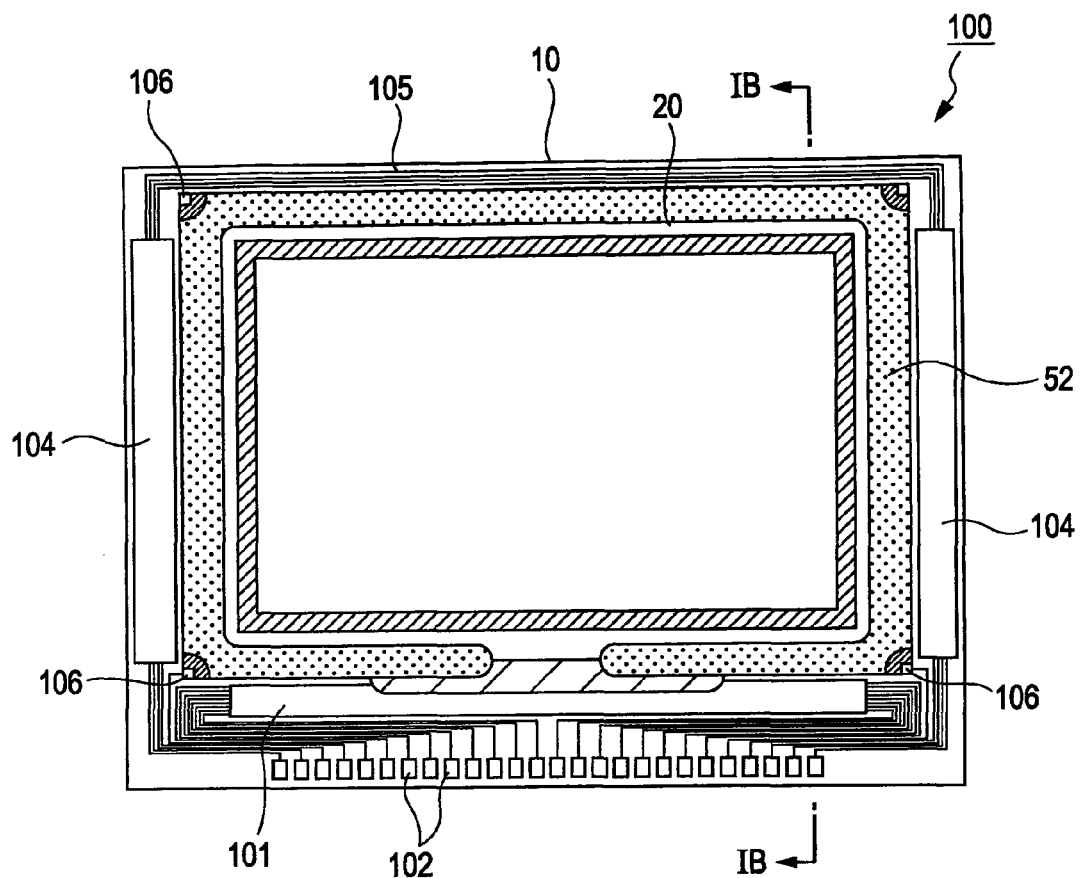
FIGS. 1A and 1B are diagrams showing the entire structure of a liquid crystal display device according to a first embodiment of the invention.
Figure 1B:
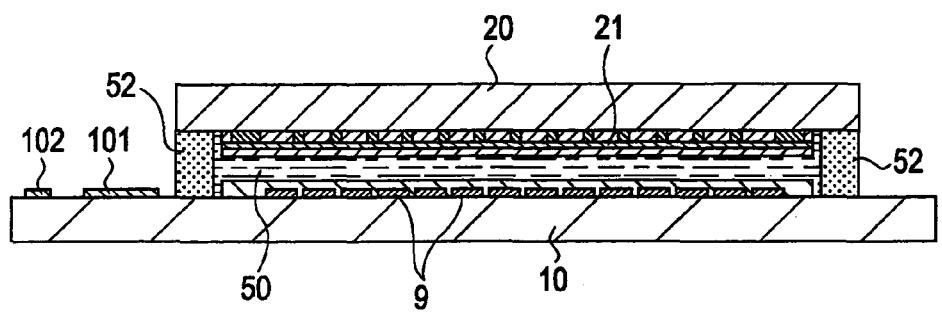

FIG. 1A is a plan view of the liquid crystal display device, respective components being viewed from a counter substrate. FIG. 1B is a cross-sectional side view of the device at the line IB-IB of FIG. 1A.

Referring to FIGS. 1A and 1B, in the liquid crystal display device 100 of the present embodiment, a TFT array substrate 10 and a counter substrate 20 are joined by a seal 52. A space between the substrates 10 and 20 defined by the seal 52 is filled with liquid crystal, thus providing a liquid crystal layer 50. In a peripheral circuit area outside the seal 52, a data signal driving circuit 101 and external circuit connecting terminals 102 are arranged along one side of the TFT array substrate 10. A scanning signal driving circuit 104 is arranged on each side adjacent to the above-mentioned one side. A plurality of pixel electrodes 9 are arranged on the inner surface of the TFT array substrate 10 and a common electrode 21 is disposed on the inner surface of the counter substrate 20 such that the pixel electrodes 9 face the common electrode 21 with the liquid crystal layer 50 therebetween. In each corner of the counter substrate 20, an inter-substrate conductive member 106 for conduction between the TFT array substrate 10 and the counter substrate 20 is arranged.

Figure 2:
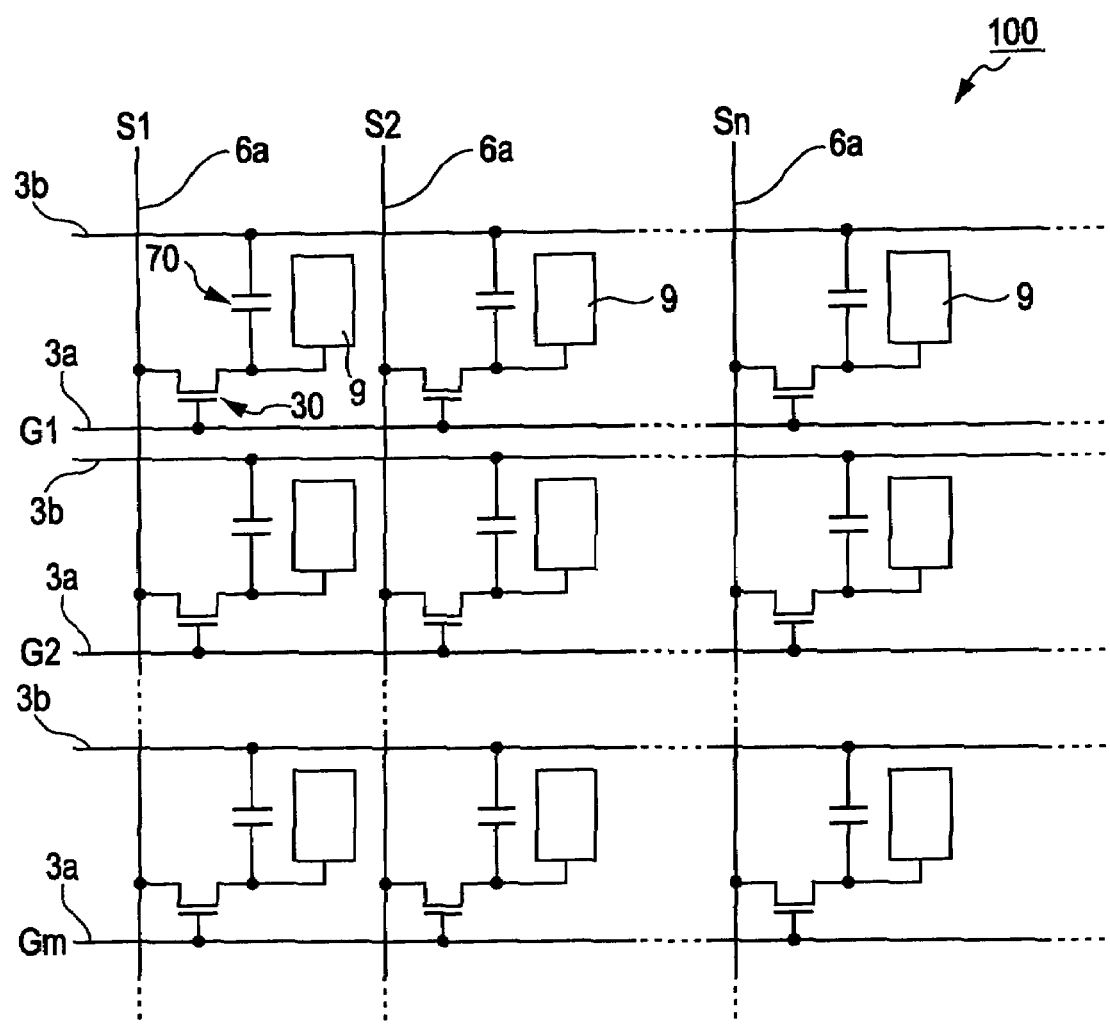
FIG. 2 is a circuit diagram of the liquid crystal display device.

FIG. 2 is an equivalent circuit diagram of the liquid crystal display device 100 using TFTs. In an image display area of the liquid crystal display device 100, data lines 6a and scanning lines 3a are arranged in a lattice. In the vicinity of each intersection of the lines 6a and 3a, a subpixel serving as an image display unit is arranged. The pixel electrodes 9 are provided for the respective subpixels arranged in a matrix. A TFT 30, serving as a switching element for controlling power supply to the corresponding pixel electrode 9, is arranged in the vicinity of each pixel electrode 9. The source of each TFT 30 is electrically connected to the data line 6a. Image signals S1, S2, . . . , and Sn are supplied to the respective data lines 6a. The gate of each TFT 30 is electrically connected to the scanning line 3a. Scanning signals G1, G2, . . . , and Gm are supplied as pulse signals to the respective scanning lines 3a at predetermined timing. The drain of each TFT 30 is electrically connected to the pixel electrode 9. When the TFTs 30, serving as the switching elements, are turned on for a predetermined period in response to the scanning signals G1, G2, . . . , and Gm supplied from the respective scanning lines 3a, the image signals S1, S2, . . . , and Sn supplied from the respective data lines 6a are written in liquid crystal in the respective subpixels at predetermined timing.

The image signals S1, S2, . . . , and Sn, each having a predetermined level, written in liquid crystal are held by liquid crystal capacitors between the respective pixel electrodes 9 and the common electrode 21, which will be described later, for a predetermined period of time. To prevent leakage of the held image signals S1, S2, . . . , and Sn, a storage capacitor 70 is arranged between each pixel electrode 9 and the corresponding capacitor line 3b. The storage capacitor 70 and the associated liquid crystal capacitor are arranged in parallel. As described above, when a voltage signal is applied to liquid crystal, the orientation of liquid crystal molecules changes depending on a level of the applied voltage. Thus, light incident on the liquid crystal is modulated, thus providing grayshade.

Figure 3A:
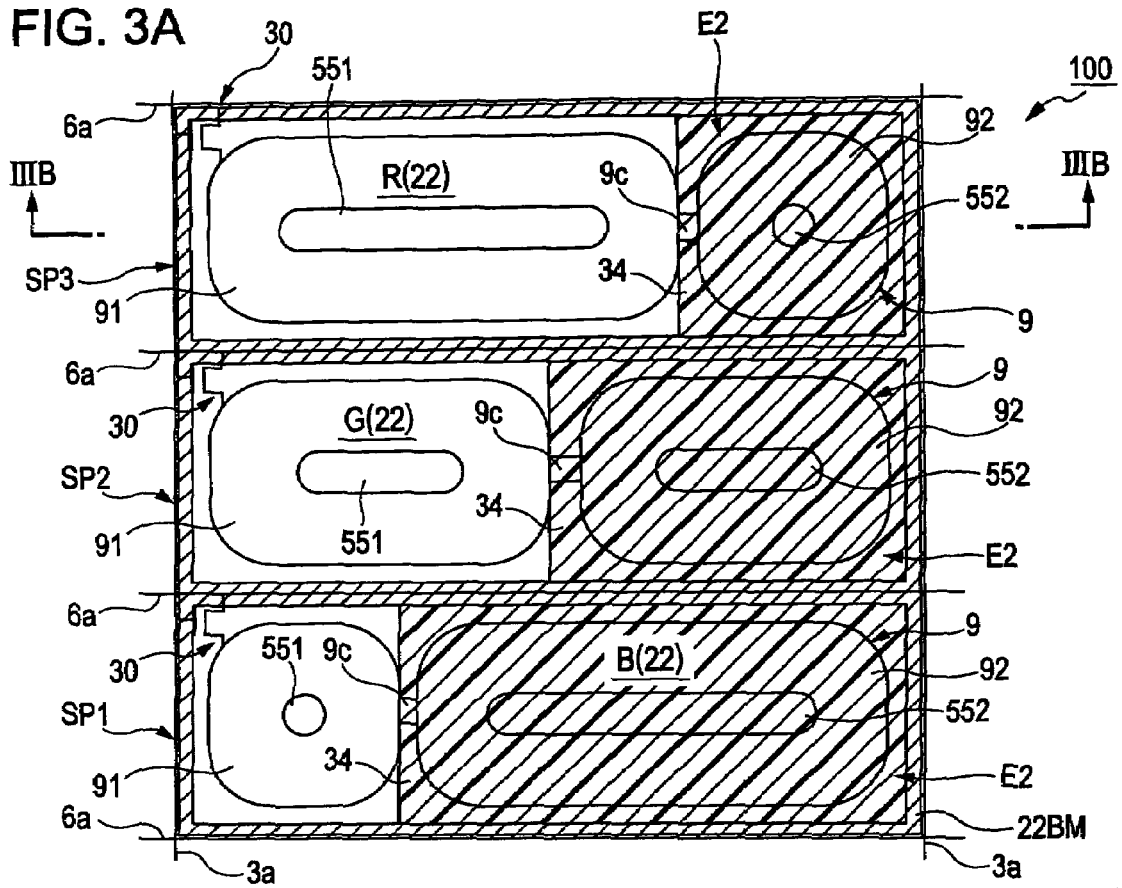
FIG. 3A is a plan view of one pixel of the liquid crystal display device.
Figure 3B:
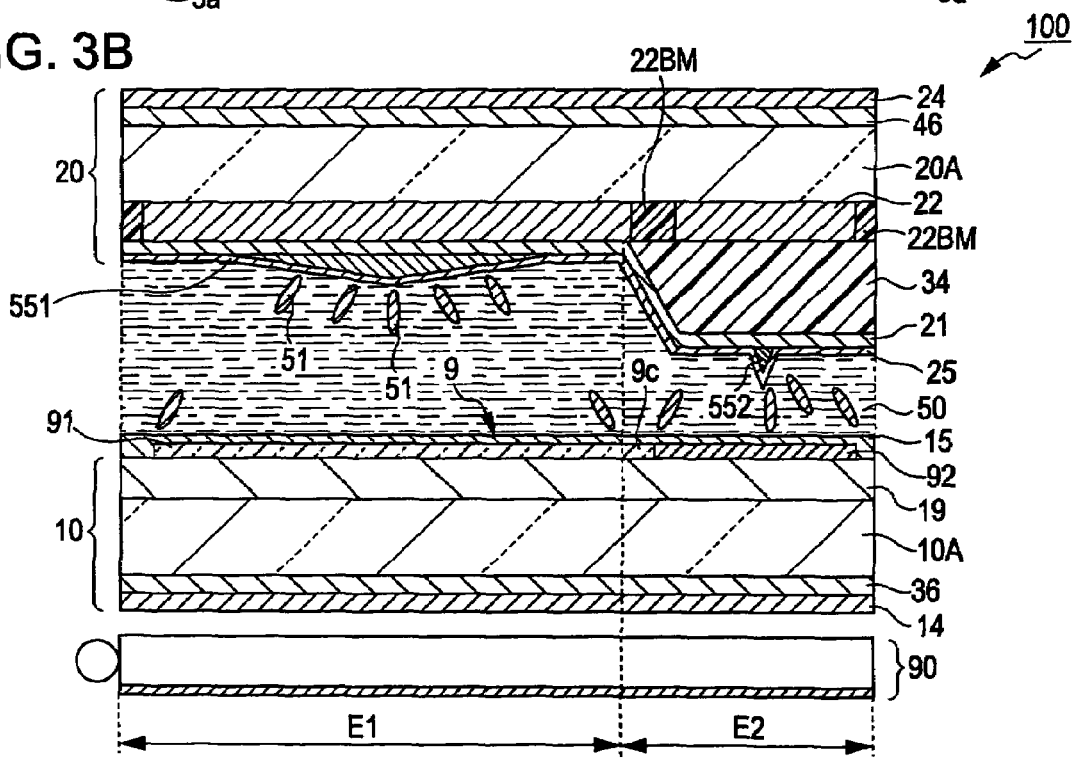
FIG. 3B is a cross-sectional view at the line IIIB-IIIB of FIG. 3A.

FIGS. 3A and 3B are diagrams explaining the liquid crystal display device 100 according to the present embodiment. FIG. 3A is a plan view of a certain pixel in the liquid crystal display device 100. FIG. 3B is a cross-sectional view at the line IIIB-IIIB of FIG. 3A.

Referring to FIG. 3A, each pixel of the liquid crystal display device 100 includes three subpixels SP1 to SP3 arranged in the Y-axis direction. Each of the flat rectangular subpixels SP1 to SP3 includes the pixel electrode 9 and the TFT 30, serving as a pixel switching element. The data lines 6a extend in the lateral direction (X-axis direction). The scanning lines 3a extend in the longitudinal direction (Y-axis direction). Each TFT 30 is arranged in the vicinity of the intersection of the data line 6a and the scanning line 3a and is electrically connected to the data line 6a and the scanning line 3a.

A color filter (colored layer) 22 having any of three primary colors is arranged for each subpixel. The three subpixels SP1 to SP3 constitute one pixel having the three color filters. The color filters 22R, 22G, and 22B form a stripe pattern such that the respective filters extend in the X-axis direction. In other words, each color filter extends over a plurality of subpixels in the X-axis direction and the color filters of each color are arranged at predetermined intervals in the Y-axis direction. A rectangular frame-shaped black matrix (light-shielding film) 22BM is arranged around the respective color filters 22 such that the black matrix 22BM surrounds the subpixels SP1.

Referring to FIG. 3A, the pixel electrode 9 arranged in each of the subpixels SP1 to SP3 is divided into two island portions 91 and 92. The adjacent island portions 91 and 92 are connected through a linking portion 9c. Each of the island portions 91 and 92 includes a transparent conductive layer made of, for example, indium tin oxide (ITO). A region, where these island portions 91 and 92 are arranged, serves as a transmissive display area. Each linking portion 9c connecting the island portions 91 and 92 includes a transparent conductive layer made of, for example, ITO. Accordingly, the linking portion 9c contributes to transmissive display. The island portions 91 and 92 each have a curved shape with rounded corners. Each of the island portions 91 and 92 may have a substantially octagonal shape with chamfered corners. A dielectric protrusion 551 is arranged substantially at the center of each island portion 91. A dielectric protrusion 552 is arranged substantially at the center of each island portion 92. The dielectric protrusions 551 and 552 function so as to control the alignment of liquid crystal molecules.

Referring to FIG. 3B, the liquid crystal display device 100 includes the TFT array substrate 10 and the counter substrate 20 facing the substrate 10. The liquid crystal layer 50 including liquid crystal having a negative anisotropy of dielectric constant (and having an anisotropy of refractive index Δn of, for example, 0.1) is sandwiched between the substrates 10 and 20. As shown in FIG. 3B, the liquid crystal layer 50 has a substantially uniform thickness within an area in which the pixel electrode 9 is arranged. A backlight 90 having a light source, a reflector, a light guide plate constituting an illumination system is arranged on the outer surface of the TFT array substrate 10, i.e., outside a liquid crystal display cell. Oval bars, shown at 51, conceptually denote liquid crystal molecules aligned perpendicular to the dielectric protrusions 551 and 552 under the influences of the dielectric protrusions 551 and 552.

The TFT array substrate 10 includes a base 10A made of a light-transmissive material, such as quartz or glass. On the inner surface (close to the liquid crystal layer 50) of the base 10A, a circuit layer 19 including the TFT 30 is arranged. The pixel electrode 9 is disposed on the circuit layer 19. A homeotropic alignment layer 15 made of, for example, polyimide is arranged over the pixel electrode 9 and the circuit layer 19. When a voltage is not applied, the homeotropic alignment layer 15 allows the liquid crystal molecules 51 to be aligned perpendicular to the surface of the substrate 10. A first retardation film 36 and a first polarizer 14 are laminated on the outer surface of the base 10A.

The counter substrate 20 includes a base 20A made of a light-transmissive material, such as quartz or glass. On the inner surface of the base 20A, the color filter 22 is arranged. The color filters 22 include a plurality of colored layers having different colors. The black matrix 22BM made of, for example, black resin is arranged between the color filters having different colors.

A stepped layer 34 is selectively arranged on the inner surface of each color filter 22 such that the layer 34 is opposed to a region where the island portion 92 is arranged. The stepped layer 34 arranged partially in each subpixel makes the thickness of the liquid crystal layer 50 in a first region E1, where the island portion 91 is arranged, different from that in a second region E2 where the island portion 92 is arranged. The stepped layer 34 is made of an organic material, such as acrylic resin. The thickness of the liquid crystal layer 50 in a portion (the second region E2), where the stepped layer 34 is arranged, is approximately ½ to ⅔ of that in a portion (the first region E1) where the stepped layer 34 is not disposed. In other words, the stepped layer 34 makes the thickness of the liquid crystal layer 50 in the first region E1 different from that in the second region E2 and also provides an intra-pixel stepped structure.

When a plurality of regions having different thicknesses of the liquid crystal layer exist in each transmissive display area, the gray levels of these regions are mixed, resulting in a gradual change in color as viewed at an angle. In other words, since the gray level characteristics of the first region E1 differs from those of the second region E2, the gray level characteristics of these regions are averaged, so that a change in color caused in one region can be compensated for in the other region.

The plane area of the stepped layer 34 depends on a color expressed by each subpixel. As the wavelength of a color expressed by the subpixel is longer, the area ratio of the first region E1 in the subpixel is larger. In the present embodiment, the subpixels SP1 to SP3 express red (R), green (G), and blue (B), respectively. The relationship among the subpixels SP1 to SP3 in the area ratio of the first region E1 is expressed as SP1 (R)>SP2 (G)>SP3 (B).

In the vicinity of the boundary between the first and second regions E1 and E2, an inclined surface where the thickness of the stepped layer 34 gradually varies is arranged. The inclined surface is two-dimensionally substantially superimposed on the edge of the island portion 92 close to the island portion 91 and is also two-dimensionally superimposed on the linking portion 9c. Alternatively, the linking portion 9c may be extended so that the edges of the island portions 91 and 92 are slightly separated from a boundary region of the stepped layer 34. Since the orientation of liquid crystal is disturbed in the vicinity of the inclined surface, the black matrix 22BM is arranged so as to be two-dimensionally superimposed on the inclined surface, thus preventing leakage of light from a portion corresponding to the inclined surface. When the area of the black matrix 22BM is larger than that of the inclined surface, the leakage of light can be prevented more effectively. In this case, the intensity of transmitting light is slightly reduced. However, since the linking portion 9c does not significantly contribute on brightness, display quality is not significantly degraded.

The common electrode 21 is arranged over the color filter 22 and the stepped layer 34 on the inner surface of the base 20A. The dielectric protrusions 551 and 552 are arranged on the common electrode 21 opposed to the pixel electrode 9 such that the dielectric protrusions 551 and 552 protrude in the liquid crystal layer 50. Referring to FIG. 3B, each of the dielectric protrusions 551 and 552 has a substantially triangular shape in cross section. The dielectric protrusions 551 and 552 actually each have a gradually curved cross section. In the first region E1, the dielectric protrusion 551 is opposed to central part of the island portion 91. In the second region E2, the dielectric protrusion 552 is opposed to central part of the island portion 92. The dielectric protrusions 551 and 552 are arranged in the X-axis direction along the arrangement of the island portions 91 and 92. In addition, a homeotropic alignment layer 25 made of, for example, polyimide is arranged over the common electrode 21 and the dielectric protrusions 551 and 552. The homeotropic alignment layer 25 allows the liquid crystal molecules 51 to be aligned perpendicular to the surface of the substrate 20 when a voltage is not applied.

A second retardation film 46, serving as a $\lambda/4$ retardation film, and a second polarizer 24 are laminated on the outer surface of the base 20A.

In the liquid crystal display device 100 with the above-described structure in accordance with the present embodiment, light radiated from the backlight 90 is converted to circularly polarized light through the first polarizer 14 and the first retardation film 36 and is then incident on the liquid crystal layer 50. Since the liquid crystal aligned perpendicular to the substrate substantially has no anisotropy of refractive index when a voltage is not applied, the incident light travels in the liquid crystal layer 50 while maintaining a circularly polarized state. The light passing through the second retardation film 46 on the counter substrate 20 is converted to linearly polarized light that is orthogonal to the polarization axis of the second polarizer 24. The linearly polarized light does not transmit through the second polarizer 24. Consequently, the liquid crystal display device 100 according to the present embodiment provides black display (normally black mode) when a voltage is not applied.

On the other hand, when a voltage is applied to the liquid crystal layer 50, the liquid crystal molecules are aligned along the surface of the substrate, so that the liquid crystal has the anisotropy of refractive index. Consequently, the circularly polarized light incident from the backlight 90 on the liquid crystal layer 50 is converted to elliptically polarized light through the liquid crystal layer 50. When the incident light passes through the second retardation film 46, the light is not converted to linearly polarized light which is orthogonal to the polarization axis of the second polarizer 24. The whole or part of the incident light passes through the second polarizer 24. The liquid crystal display device 100 according to the present embodiment, therefore, provides white display upon application of a voltage. In the above-described structure, a voltage applied to the liquid crystal layer 50 is controlled, thus enabling grayshade. At that time, in the present embodiment, since the strip-shaped dielectric protrusions 551 and 552 extend on the common electrode 21, the liquid crystal molecules 51 are inclined outwardly from each of the dielectric protrusions 551 and 552 in the Y axis in the vicinity of each of the dielectric protrusions 551 and 552. As for an area from the periphery of each of the dielectric protrusions 551 and 552 to the edge of the corresponding island portion, the liquid crystal molecules 51 are inclined radially. In the liquid crystal display device 100 in accordance with the present embodiment, therefore, a plurality of liquid crystal domains with different directors of the liquid crystal molecules 51 are provided upon application of a voltage. Thus, display with a remarkably wide viewing angle can be realized.

Further, the boundary between the liquid crystal domains is fixed to the boundary between the adjacent island portions. Consequently, when the liquid crystal display panel is viewed at an angle, a stain or chrominance non-uniformity is not caused. Display with good quality can be provided. In addition, the boundary region of each stepped layer 34 is two-dimensionally superimposed on the linking portion 9c for electrical connection between the adjacent island portions. Thus, deterioration of display quality caused by the stepped structure can be effectively prevented. When the linking portion 9c is extended so that the facing ends of the island portions 91 and 92 are slightly separated from the boundary region of the stepped layer 34, the above-described deterioration can be more effectively prevented. The reason is as follows. The liquid crystal molecules 51 are aligned along the inclined surface of the stepped layer 34. If the electrodes are arranged in the boundary region of the stepped layer 34, an oblique electric field occurs upon application of a voltage. The alignment of liquid crystal molecules may be disturbed. In the present embodiment, since the area of the electrodes is reduced as much as possible in the boundary region of the stepped layer 34. Thus, deterioration of display quality in the boundary region of each stepped layer 34 can be effectively prevented.

Since the regions E1 and E2 having different thicknesses of the liquid crystal layer is arranged in each subpixel, the gray levels of the regions E1 and E2 with different gray-level display performances are mixed, thus reducing a change in gray level depending on a viewing angle. Particularly, in the present embodiment, the area ratio between the regions E1 and E2 having different thicknesses of the liquid crystal layer varies from color to color. Accordingly, a shift in γ characteristics can be corrected in each color. Thus, bright display having a small change in color depending on the viewing angle characteristics and excellent color reproducibility can be realized. As the wavelength of a light component is shorter, a change in phase of the light component transmitting through the liquid crystal layer is larger. Regarding the voltage-transmittance characteristics, as the wavelength of a light component is shorter, a change in transmittance is caused upon application of a smaller voltage. If the stepped layers are formed at the same area ratio of the first region E1 in the respective R, G, and B subpixels SP1 to SP3, a change in transmittance with respect to a light component R having a long wavelength may be insufficient. In the present embodiment, as the wavelength of a color light component is longer, the stepped layer 34 is formed such that the area ratio of the first region E1 in the corresponding subpixel is larger. Consequently, the change in transmittance does not vary from color to color. Thus, the liquid crystal display device with good color balance can be provided.

Figure 4A:
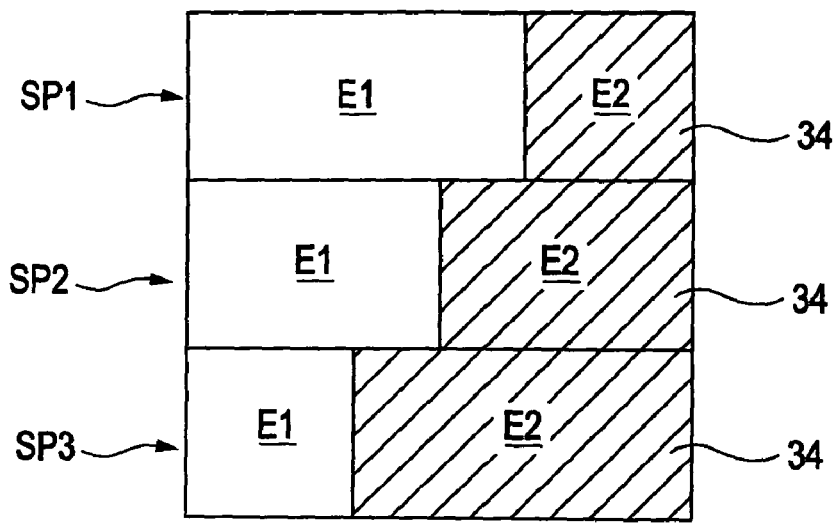
FIGS. 4A to 4C are schematic plan views showing other stepped structures.
Figure 4B:
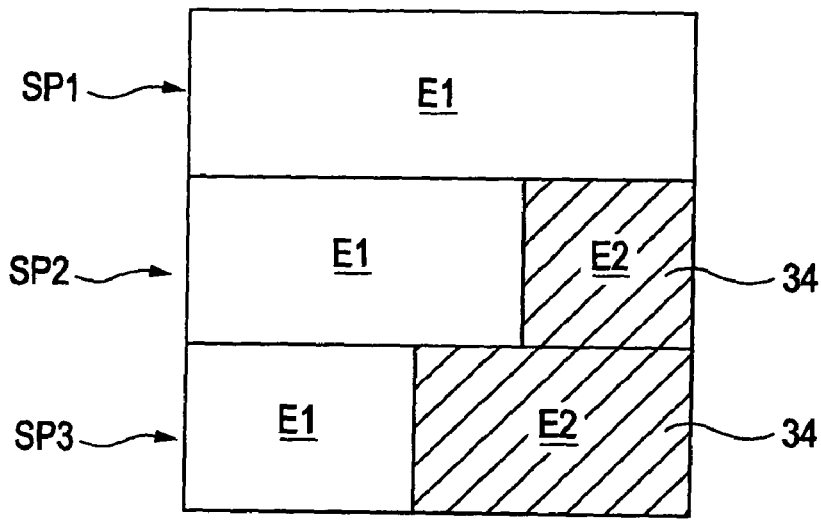
Figure 4C:
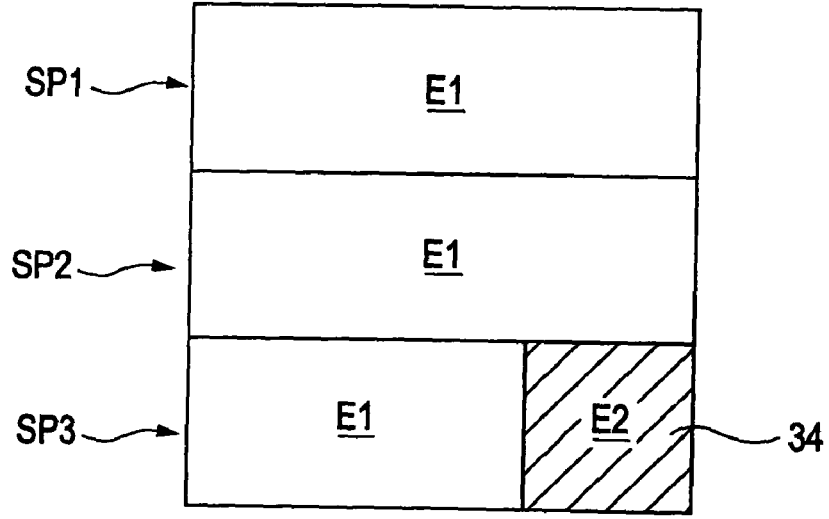

In the present embodiment, the R, G, and B subpixels have different area ratios of the first region E1. So long as at least two color subpixels have different area ratios, the viewing angle characteristics in gray level can be improved. FIGS. 4A to 4C are diagrams of other examples of the stepped layers 34. The present embodiment uses the arrangement of FIG. 4A. The arrangement of FIG. 4B or 4C may be used. Referring to FIG. 4B, the area of the stepped layer 34 in the subpixel SP2 is different from that in the subpixel SP3. Those areas can be equalized. In FIG. 4A, similarly, the area of the stepped layer 34 in the subpixel SP1 can be equal to that in the subpixel SP2. Alternatively, the area of the stepped layer 34 in the subpixel SP2 can be equal to that in the subpixel SP3.

In the present embodiment, the dielectric protrusions on the common electrode are used as alignment controllers. As another alignment controller, a slit (opening) may be used. Each opening is formed in the common electrode by partially cutting the common electrode. In this case, although the action of the opening is different from that of the dielectric protrusion, the effect of controlling the orientation of liquid crystal molecules upon application of an electric field can be obtained. Alternatively, the opening and the dielectric protrusion may be arranged together in each subpixel. Assuming that the plane area of the opening is equal to that of the dielectric protrusion, generally, alignment controlling force caused by the dielectric protrusion is stronger than that caused by the opening. Accordingly, it is preferred that the opening be arranged in each of the reflective display area and the second region E2, where the liquid crystal layer is thin, of the transmissive display area and the dielectric protrusion be arranged in the first region E1, where the liquid crystal layer is thick, of the transmissive display area. Further, a dielectric protrusion may be arranged within the opening.

Second Embodiment

A second embodiment of the invention will now be described.

Figure 5A:
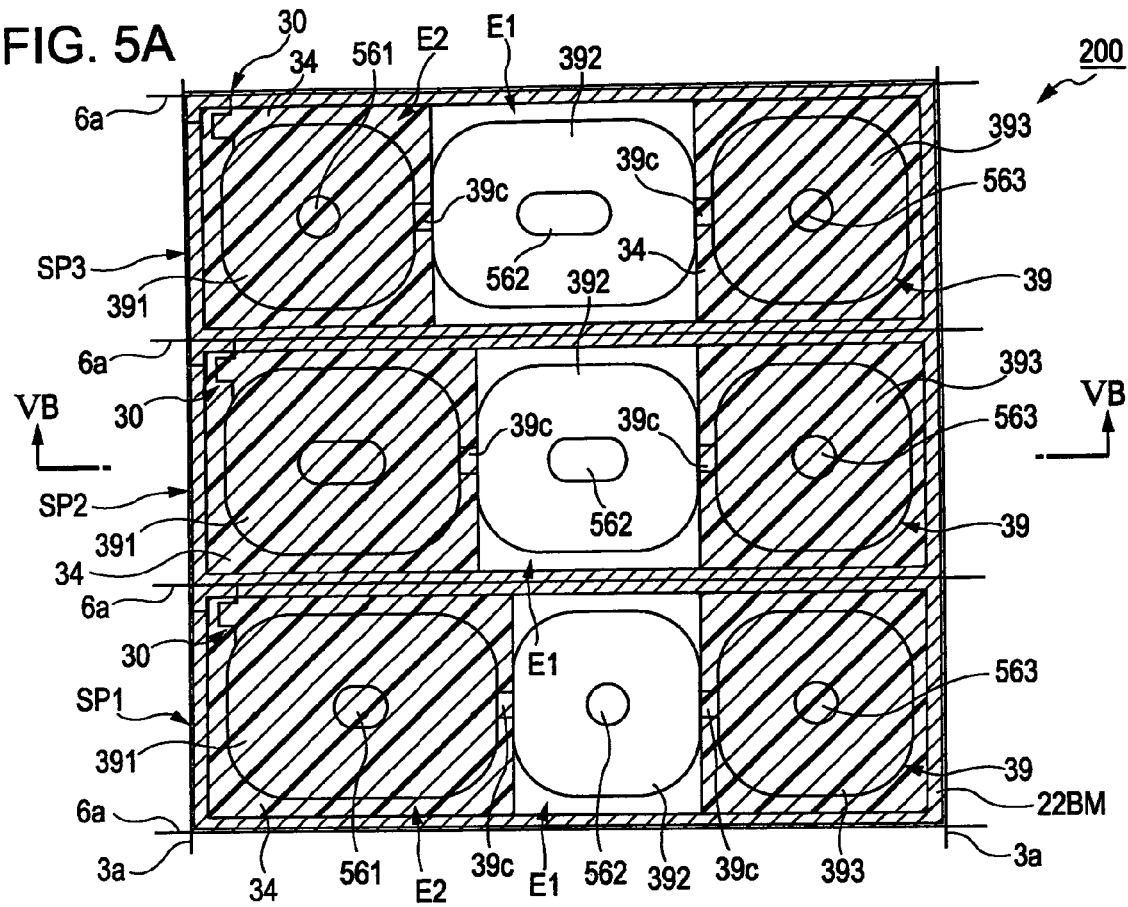
FIG. 5A is a plan view of one pixel of a liquid crystal display device in accordance with a second embodiment of the invention.
Figure 5B:
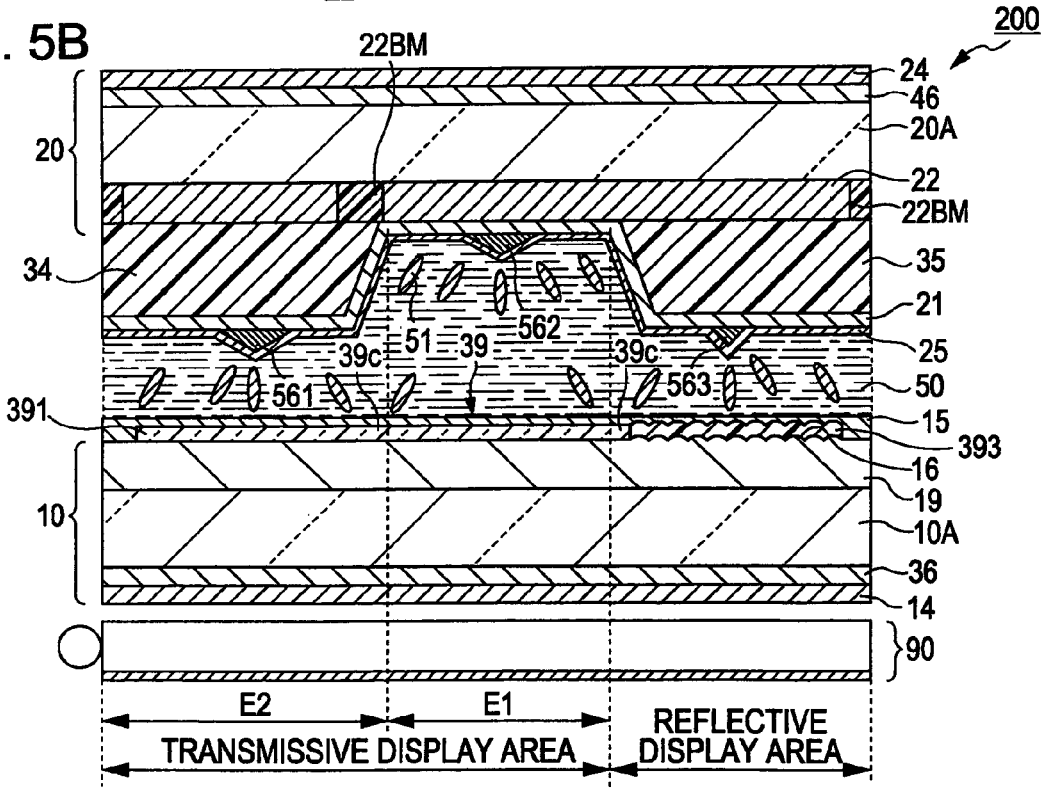
FIG. 5B is a cross-sectional view at the line VB-VB of FIG. 5A.

FIG. 5A is a plan view of each pixel of a liquid crystal display device 200 in accordance with the present embodiment. FIG. 5B is a cross-sectional view at the line VB-VB of FIG. 5A. The same components and portions as those in the first embodiment are designated by the same reference numerals and a detailed description thereof is omitted.

Referring to FIG. 5A, the liquid crystal display device 200 of the present embodiment is an active matrix transflective liquid crystal display in which a reflecting electrode 393 is partially arranged in each of subpixels SP1 to SP3 and a TFT 30 is arranged as a switching element in each subpixel.

A pixel electrode 39 is arranged in each subpixel. The pixel electrode 39 includes three island portions 391, 392, and 393 which are electrically connected through linking portions 39c. The island portions 391, 392, and 393 are arranged in this order in the lengthwise direction of each pixel electrode 39. The two island portions 391 and 392 from the left of each pixel electrode 39 in FIG. 5A serve as transparent electrodes each including a transparent conductive layer made of, for example, ITO. The island portion 393 on the right of each pixel electrode 39 serves as a reflecting electrode including a reflective metal layer made of, for example, aluminum or silver.

The island portion 393, including the reflective metal layer of aluminum or silver, functions as a reflecting layer in each subpixel. A region where the island portion 393 is arranged serves as a reflective display area. An insulating layer 16 is selectively arranged in each reflective display area on a circuit layer 19. The island portion 393 is arranged on the insulating layer 16 in each reflective display area. The insulating layer 16 has an uneven surface. The island portion 393 has an uneven surface along the uneven surface of the insulating layer 16. Reflected light is scattered by the uneven surface, thus providing display with excellent visibility.

A region, where the island portions 391 and 392 functioning as the transparent electrodes are arranged, serves as a transmissive display area. In the liquid crystal display device 200 in accordance with the present embodiment, approximately ⅓ of the displayable area of each subpixel contributes to reflective display and the remaining ⅔ thereof contributes to transmissive display. The linking portions 39c connecting the island portions 391, 392, and 393 each include a transparent conductive layer made of, for example, ITO. The linking portions 39c, therefore, contribute to transmissive display. Dielectric protrusions 561, 562, and 563, each serving as an alignment controller for controlling the alignment of liquid crystal molecules, are arranged in substantially central parts of the island portions 391, 392, and 393, respectively. In the present embodiment, the island portions 391, 392, and 393 each have a curved shape with rounded corners. Each island portion may have a substantially octagonal shape with chamfered corners.

Referring to FIG. 5B, the liquid crystal display device 200 includes a TFT array substrate 10 and a counter substrate 20 facing the substrate 10. A liquid crystal layer 50 contains liquid crystal having a negative anisotropy of dielectric constant. The liquid crystal layer 50 is sandwiched between the substrates 10 and 20. A backlight 90 is arranged on the outer surface of the TFT array substrate 10, i.e., outside a liquid crystal display cell.

The TFT array substrate 10 includes a base 10A. The circuit layer 19 similar to that of the first embodiment is arranged on the inner surface (close to the liquid crystal layer 50) of the base 10A. The pixel electrode 39, including the island portions 391 and 392 (the transparent electrodes) and the island portion 393 (the reflecting electrode), is disposed on the circuit layer 19. The insulating layer 16 is arranged between the circuit layer 19 and the island portion 393. The surface of the insulating layer 16 is partially uneven. The island portion 393 is arranged in a region with the uneven surface. The pixel electrode 39 and the circuit layer 19 are covered with a homeotropic alignment layer 15 made of, for example, polyimide. When a voltage is not applied, the homeotropic alignment layer 15 allows liquid crystal molecules 51 to be aligned perpendicular to the surface of the substrate 10. A first retardation film 36, serving as a λ/4 retardation film, and a first polarizer 14 are laminated on the outer surface of the base 10A.

The counter substrate 20 includes a base 20A. On the inner surface of the base 20A, a color filter 22 is arranged over the reflective display area and the transmissive display area in each subpixel. The color filters 22 include a plurality of colored layers having different colors. A black matrix 22BM made of, for example, black resin is arranged between the colored filters having different colors.

On the inner surface of each color filter 22, a stepped layer 34 is arranged in a region where the island portion 391 is formed in the transmissive display area (where the island portions 391 and 392 are arranged). In addition, on the inner surface of the color filter 22, a thickness adjusting layer 35 for thickness adjustment of the liquid crystal layer is arranged so as to correspond to the reflective display area (where the island portion 393 is disposed). In each of the subpixels SP1 to SP3, a second region E2 where the-stepped layer 34 is arranged, a first region E1 where the stepped layer 34 is not arranged, and the reflective display area where the thickness adjusting layer 35 is disposed are arranged in this order in the lengthwise direction of the subpixel. In other words, the stepped layer 34 and the thickness adjusting layer 35 are arranged on both ends of each subpixel, thus providing a stepped structure. Consequently, the thickness of the liquid crystal layer 50 is made different between the reflective display area and the first region E1 by the thickness adjusting layer 35 selectively arranged in each subpixel and is also made different between the first region E1 and the second region E2 by the stepped layer 34 selectively arranged.

The thickness adjusting layer 35 is made of an organic material, such as acrylic resin. The thickness of the layer 35 is set to about 2±1 μn. The thickness of the liquid crystal layer 50 in the transmissive display area segment E1, where neither the thickness adjusting layer 35 nor the stepped layer 34 are arranged, is about 2 μm to about 6 μm. The thickness of the liquid crystal layer 50 in the reflective display area is about the half of that in the transmissive display area segment E1. In other words, the thickness adjusting layer 35 makes the thickness of the liquid crystal layer 50 in the reflective display area different from that in the transmissive display area segment E1 and also provides a multi-gap structure.

The stepped layer 34 is made of the same material as that of the thickness adjusting layer 35. In other words, the stepped layer 34 is formed by the same process as that for the thickness adjusting layer 35. The stepped layer 34 made of the same organic material, such as acrylic resin, as that of the thickness adjusting layer 35 is arranged in the second region E2 in the transmissive display area. The stepped layer 34 makes the thickness of the liquid crystal layer 50 in the first region E1 different from that in the second region E2.

The plane area of the stepped layer 34 depends on a color expressed by each subpixel. As the wavelength of a color expressed by the subpixel is longer, the area ratio of the first region E1 is larger in the subpixel. In the present embodiment, the subpixels SP1 to SP3 express red (R), green (G), and blue (B), respectively. The relationship among the subpixels SP1 to SP3 in the area ratio of the first region E1 is expressed as SP1 (R)>SP2 (G)>SP3 (B).

The stepped layer 34 and the thickness adjusting layer 35 can be formed by applying, for example, a photosensitive resin to the whole surface of the substrate 20 and removing the resin in each first region E1 using development and exposure. Referring to FIG. 5B, the thickness of the stepped layer 34 is approximately equal to that (i.e., about 2±1 μm) of the thickness adjusting layer 35. In other words, the thickness of the liquid crystal layer 50 in the second region E2 of the transmissive display area is approximately equal to that in the reflective display area. In this case, it is unnecessary to perform an additional process of adjusting the thickness of the liquid crystal layer 50 in the transmissive display area, leading to ease of manufacture. The stepped layer 34 and the thickness adjusting layer 35 may be made different from each other in thickness by controlling the amount of exposure.

The liquid crystal display device 200 with the above-described structure in accordance with the present embodiment can provide bright and high-contrast display. In addition, the liquid crystal display device 200 has excellent viewing angle characteristics in gray level in a transmissive display mode. In the vicinity of the boundary between the reflective display area and the first region E1 in each subpixel, an inclined surface where the thickness of the thickness adjusting layer 35 gradually changes is arranged. The inclined surface is two-dimensionally substantially superimposed on the end of the reflecting electrode 393 close to the transparent electrode 392 and is also two-dimensionally superimposed on the linking portion 39c. Alternatively, the linking portion 39c may be extended such that the edges of the island portions 392 and 393 are slightly separated from a boundary region of the thickness adjusting layer 35. In the inclined surface, an oblique electric field occurs upon application of a voltage, so that the alignment of the liquid crystal molecules may be disturbed. In the present embodiment, the narrow linking portion 39c serves as the pixel electrode corresponding to the inclined surface. The area of the electrodes is reduced as much as possible in the boundary region of the thickness adjusting layer 35. Thus, deterioration of display quality can be minimized.

Further, a common electrode 21 is arranged on the inner surface of the base 20A such that the color filter 22, the stepped layer 34, and the thickness adjusting layer 35 of each subpixel are covered with the common electrode 21. The dielectric protrusions 561 to 563 are arranged on the common electrode 21 such that the dielectric protrusions face each pixel electrode 39 and protrude in the liquid crystal layer 50. Referring to FIG. 5B, each of the dielectric protrusions 561 to 563 has a substantially triangular shape in cross section. Actually, the dielectric protrusions 561 to 563 each have a gradually curved cross section. In the transmissive display area, the dielectric protrusions 561 and 562 are opposed to central parts of the transparent electrodes 391 and 392, respectively. In the reflective display area, the dielectric protrusion 563 is opposed to central part of the reflecting electrode 393. The dielectric protrusions 561, 562, and 563 are arranged in the X-axis direction along the arrangement of the transparent electrodes 391 and 392 and the reflecting electrode 393. In addition, the dielectric protrusions 561 to 563 and the common electrode 21 are covered with a homeotropic alignment layer 25 made of, for example, polyimide. The homeotropic alignment layer 25 allows the liquid crystal molecules 51 to be aligned perpendicular to the surface of the substrate 20 when a voltage is not applied. A second retardation film 46, serving as a λ/4 retardation film, and a second polarizer 24 are laminated on the outer surface of the base 20A.

In the liquid crystal display device 200 with the above-described structure in accordance with the present embodiment, the display operation in a transmissive mode is the same as that in the first embodiment. In other words, the liquid crystal molecules 51 are inclined outwardly from each of the dielectric protrusions 561 and 562 in the Y axis in the vicinity of each of the dielectric protrusions 561 and 562. As for an area from the periphery of each of the dielectric protrusions 561 and 562 to the edge of the corresponding island portion, the liquid crystal molecules 51 are inclined radially. Therefore, a plurality of liquid crystal domains with different directors of the liquid crystal molecules 51 are provided upon application of a voltage. Thus, display with a remarkably wide viewing angle can be realized. In addition, since the regions E1 and E2 having different thicknesses of the liquid crystal layer are arranged in each subpixel, the gray levels of the regions E1 and E2 with different gray-level display performances are mixed, thus reducing a change in the gray level depending on a viewing angle. Particularly, since the area ratio between the regions E1 and E2 having different thicknesses of the liquid crystal layer varies from color to color in the present embodiment, a shift in γ characteristics can be corrected in each color. Thus, bright display having a small change in color depending on the viewing angle characteristics and excellent color reproducibility can be realized.

In a reflective mode, external light radiated from the outside of the counter substrate 20 is converted to circularly polarized light through the second polarizer 24 and the second retardation film 46 and is then incident on the liquid crystal layer 50. Since the liquid crystal aligned perpendicular to the substrate substantially has no anisotropy of refractive index when a voltage is not applied, the incident light travels in the liquid crystal layer 50 while maintaining a circularly polarized state and then reaches the reflecting electrode 393. The light is reflected by the reflecting electrode 393 and is then returned to the liquid crystal layer 50. The reflected light is again incident on the second retardation film 46. At that time, the direction of rotation of the circularly polarized light reflected through the reflecting electrode 393 is reversed. Accordingly, the light is converted through the second retardation film 46 to linearly polarized light that is orthogonal to the polarization axis of the second polarizer 24. The linearly polarized light does not transmit through the second polarizer 24. Consequently, the liquid crystal display device 200 in accordance with the present embodiment provides black display (normally black mode) when a voltage is not applied.

On the other hand, when a voltage is applied to the liquid crystal layer 50, the liquid crystal molecules are aligned along the surface of the substrate, so that the liquid crystal has the anisotropy of refractive index. Consequently, the circularly polarized light, which is radiated from the outside of the counter substrate 20 and is incident on the liquid crystal layer 50, is converted to linearly polarized light through the liquid crystal layer 50. The linearly polarized light reaches the reflecting electrode 393. After the light is reflected by the reflecting electrode 393, the reflected light passes through the liquid crystal layer 50 and enters the second retardation film 46. Since the reflected light is circularly polarized light in the same direction of rotation as that of the foregoing incident light, the reflected light is converted through the second retardation film 46 to linearly polarized light that is parallel to the polarization axis of the second polarizer 24. The linearly polarized light passes through the second polarizer 24. The liquid crystal display device 200 of the present embodiment, therefore, provides white display upon application of a voltage.

With the above-described structure, a voltage applied to the liquid crystal layer 50 is controlled, thus performing gray-shade. In this instance, since the dielectric protrusion 563 is opposed to the central part of the reflecting electrode 393 in the present embodiment, the liquid crystal molecules 51 are aligned perpendicular to the border of the reflecting electrode 393. In the vicinity of the dielectric protrusion 563, the liquid crystal molecules 51 are aligned outwardly from the dielectric protrusion 563 upon application of a voltage. As viewed two-dimensionally, the liquid crystal molecules 51 are aligned radially around the vicinity of the dielectric protrusion 563. In the liquid crystal display device 200 of the present embodiment, therefore, the directors of the liquid crystal molecules 51 are oriented in all directions, thus providing display with a remarkably wide viewing angle.

In the present embodiment, the stepped layer 34 is arranged in the transmissive display area in each subpixel to improve the viewing angle characteristics in gray level in the transmission display mode. The stepped layer 34 may be arranged in the reflective display area. Alternatively, the stepped layer 34 may be arranged in each of the transmissive and reflective display areas.

Electronic Apparatus

Figure 6:
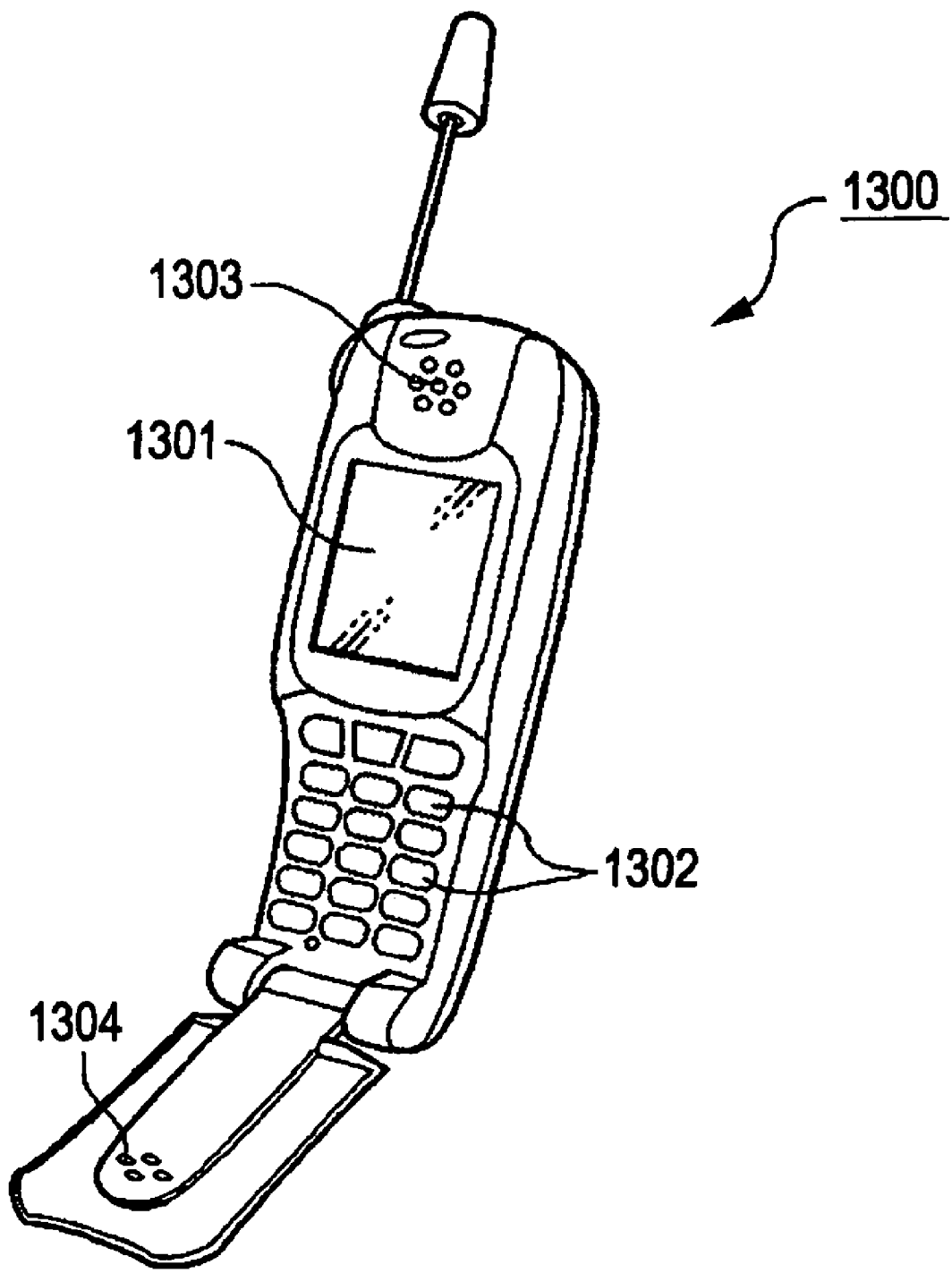
FIG. 6 is a perspective view illustrating an electronic apparatus.

FIG. 6 is a perspective view illustrating an electronic apparatus according to the invention. Referring to FIG. 6, a mobile phone 1300 includes a small-sized display unit 1301 to which the liquid crystal display device according to the invention is applied, a plurality of operation buttons 1302, an earpiece 1303, and a mouthpiece 1304.

The electronic apparatus according to the invention is not limited to the above-described mobile phone. The display device in accordance with each of the embodiments of the invention may be suitably used as an image display unit of an electronic apparatus, e.g., a personal computer, a digital still camera, a liquid crystal television, a view-finder type or monitor-direct-view type video tape recorder, a car navigation system, a pager, an electronic organizer, an electronic calculator, a word processor, a workstation, a videophone, a POS terminal, or an apparatus having a touch panel. The display device can provide bright display in any of the electronic apparatuses.

Having described the preferred embodiments of the invention referring to the accompanying drawings, it should be understood that the invention is not limited to those embodiments and various changes and modifications of the combination, arrangement, and shapes of parts in the above-described embodiments may be made on the basis of design requirements without departing from the spirit or scope of the invention.

The entire disclosure of Japanese Patent Application No. 2006-024663, filed Feb. 1, 2006 is expressly incorporated by reference herein.

What is claimed is:
1. A liquid crystal display device comprising:
a first substrate and a second substrate;
a liquid crystal layer between the first and second substrates, the liquid crystal layer containing liquid crystal molecules having a negative anisotropy of dielectric constant; and an alignment layer between the liquid crystal layer and at least one of the substrates, the alignment layer controlling the liquid crystal molecules to be aligned perpendicular to the substrate, a dielectric protrusion that protrudes in the liquid crystal layer, wherein the alignment layer covers the dielectric protrusion, the liquid crystal display device further including pixels, each pixel including a plurality of subpixels, each subpixel having a transmissive display area for transmissive display and a reflective display area for reflective display, the subpixel including a stepped layer therein such that the stepped layer is disposed between the liquid crystal layer and at least one of the substrates, the stepped layer defining a first region and a second region in the transmissive display area of the subpixel, the thickness of the liquid crystal layer being relatively thick in the first region and relatively thin in the second region, the area ratio of the first region depending on a color expressed by the subpixel, wherein the area ratio of the first region in the transmissive display area of the subpixel is larger as the wavelength of the color expressed by the subpixel is longer.

2. The device according to claim 1, wherein the subpixel includes a thickness adjusting layer therein such that the thickness adjusting layer is disposed between the liquid crystal layer and at least one of the substrates, the thickness adjusting layer making the thickness of the liquid crystal layer in the reflective display area less than that in the transmissive display area, the stepped layer is disposed in the transmissive display area, and the stepped layer and the thickness adjusting layer are made of the same material.

3. The device according to claim 1, further comprising:

a plurality of electrodes on respective surfaces of the first and second substrates close to the liquid crystal layer, the electrodes driving the liquid crystal molecules, wherein each subpixel includes the electrode on at least one of the substrates, the electrode includes a plurality of island portions and linking portions each electrically connecting the adjacent island portions, and the linking portion is two-dimensionally superimposed on a boundary region of the stepped layer.

4. The device according to claim 1, further comprising:

a light-shielding layer on at least one of the first and second substrates, wherein the light-shielding layer is two-dimensionally superimposed on the boundary region of the stepped layer in the subpixel.

5. The device according to claim 1, wherein the thickness of the liquid crystal layer in the second region is approximately equal to that in the reflective display area.

* * * * *